Oct. 21, 1958 R. H. FROST 2,856,810
POLARIZING VIEWING VISORS FOR VEHICLES
Filed April 4, 1955

INVENTOR.
RICHARD H. FROST
BY
ATTORNEY

United States Patent Office 2,856,810
Patented Oct. 21, 1958

2,856,810

POLARIZING VIEWING VISORS FOR VEHICLES

Richard H. Frost, Littleton, Colo.

Application April 4, 1955, Serial No. 498,987

3 Claims. (Cl. 88—1)

This invention relates to anti-glare devices; and more particularly, to polarizing visors adapted for use with vehicles to vary the intensity of transmitted light reaching the viewer.

It is well known that it is dangerous, as well as extremely uncomfortable, to travel in an automobile when the driver and passengers are forced to look into the early morning or late evening sun. The conventional sun visor found on most automobiles is ineffective at such times, and also dangerous, because it blocks out the driver's view of a considerable portion of the road ahead along with the sun.

Transparent visors which are provided with means for varying the amount of light transmitted are known in the art; however, most of them employ a plurality of tinted sunshades of successively deeper hue which when superimposed over one another vary the amount of light transmitted. These shades possess many of the same disadvantages of the opaque visor in that adjustment of the visor to block out the sun also results in the obstruction of the driver's view of the highway.

Polarizing viewing visors are also known but they are relatively ineffective in blocking the direct rays of the sun as they are primarily designed to lessen the glare reflected from the road and the hood of the automobile by means of a vertical plane of polarization.

It is, therefore, the principal object of the present invention to provide a polarizing viewing visor which can be adjusted to intercept the rays of any powerful light source, such as the sun, without impairing the driver's view in other directions; and further, a visor which can be adjusted to vary the amount of light transmitted to the eyes of the viewer to any desired degree.

A second object of the invention is the provision of a polarizing viewing visor which is easily and rapidly adjustable with only one hand as to both the amount of light transmitted and the position of the visor with respect to the viewer.

Other objects of the present invention are the provision of a polarizing viewing visor which is inexpensive, lightweight, readily adapted to use with any conventional vehicle, and which provides greater comfort and safety to the driver and passengers of a vehicle.

Further objects will be in part apparent and in part pointed out specifically hereinafter in connection with the description of the drawing which follows; and in which.

Figure 5:
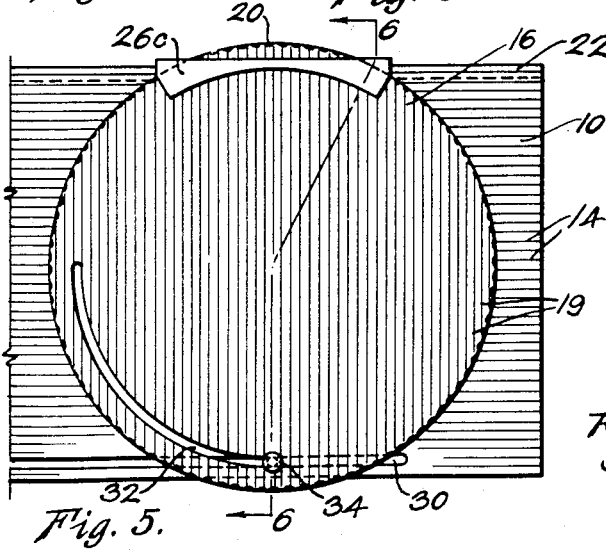
Figure 5 is a view similar to Figure 1 showing a third modification of the basic invention; and, Figure 6 is a cross sectional view taken along line 6—6 of Figure 5.

Basically, the polarizing viewing visor of the present invention comprises a transparent sheet of plane polarizing material 10 attached to a vehicle by any one of a number of conventional visor mountings, represented in a general way by mounting 12, which enable the visor to be moved into position in the line of sight of the viewer. Sheet 10 is preferably of an elongate substantially rectangular shape, as shown, in order that the visor will cover a relatively wide area of the viewer's view ahead of him. Sheet 10 has also preferably its polarizing axis in a plane which is oriented with respect to the highway and the hood of the automobile to filter out the glare-producing light reflected therefrom in the conventional manner. A transparent disk of plane polarizing material 16 is superimposed over the sheet 10, as shown, and mounted for free rotation relative thereto. Thus, the plane of polarization of the disk, represented by parallel lines 19, may be oriented relative to the plane of polarization of the sheet, represented by parallel lines 14, to vary the amount of light transmitted through the disk between wide limits. This property of variable light extinction accomplished by overlapping sheets of plane polarizing material is a well known property of polarizing substances such as that sold under the trademark Polaroid. With the planes of polarization of the sheet and disk in the position shown in Figure 1, only a portion of the light from a light source will be blocked by the disk; whereas, Figure 5 illustrates the position of maximum extinction of the disk relative to the sheet in which the disk will appear opaque because the planes of polarization are perpendicular to one another. The disk is preferably of slightly greater diameter than the width of the sheet so that it can be rotated easily with one finger placed on the portion extending above the upper edge of the sheet when positioned as shown.

Disk 16 is also mounted for longitudinal movement relative to the sheet. Several different constructions have been illustrated for rotating and sliding the disk relative to the sheet. Longitudinal movement of the disk along the sheet enables the disk to be positioned to intercept the direct rays of light from a powerful light source reaching the viewer's eyes. Thus, when travelling in a vehicle moving into the early morning or late evening sun, the viewer need only move the disk longitudinally into position between his eyes and the sun and then rotate the disk relative to the sheet until the desired degree of light extinction is obtained. It is to be noted that only that portion of the viewer's vision directly in line with the sun is blocked or dimmed by the disk while the view in other directions remains relatively unimpaired through the remaining portions of the visor. Also, the viewer's eyes will become accustomed to the diminished light intensity enabling him to see more clearly.

A number of different means for mounting the disk for rotational and longitudinal movement relative to the sheet will occur to those skilled in the art and the present invention is not intended to be restricted to any specific disk mounting device. Some of the many possible constructions by means of which the disk may be mounted for rotational and longitudinal movement have been shown in the preferred form however, and will now be described.

Figure 1:
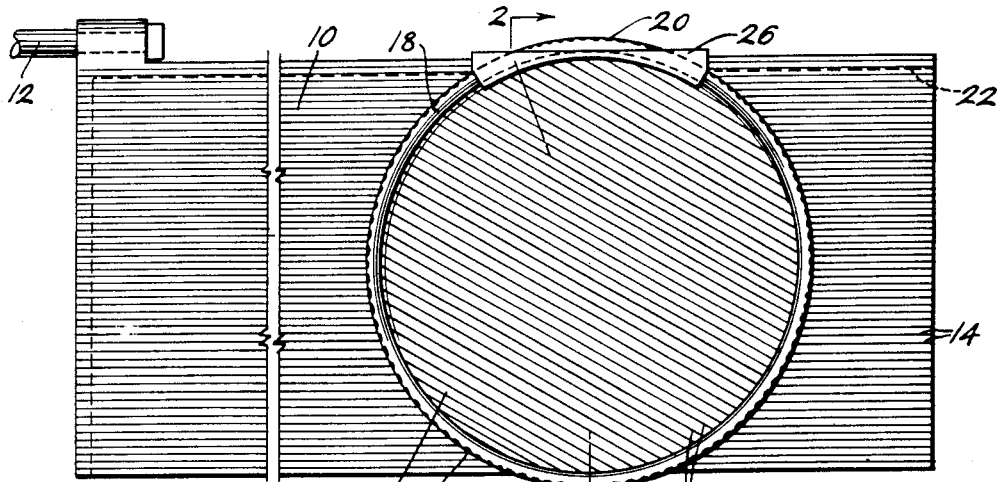
Figure 1 is an elevation, a portion of which has been broken away to conserve space, showing the polarizing viewing visor of the present invention.
Figure 2:
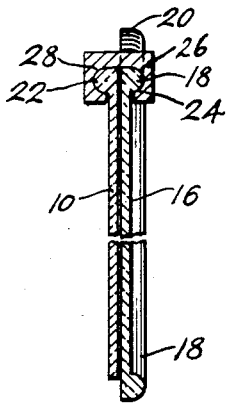
Figure 2 is an enlarged cross section thereof taken along line 2—2 of Figure 1.

Referring to Figures 1 and 2 of the drawing, it will be seen that the disk 16 is provided with a circumferential bead 18 which is provided with a knurled outer edge 20 to facilitate movement thereof. A longitudinal bead 22 is provided on the upper edge of sheet 10. Bead 18 of the disk is supported for rotational movement within arcuate groove 24 of slide 26. Arcuate groove 24 opens through the top of the slide to permit access to the knurled edge of the disk. Slide 26 is also provided with a groove 28 to receive the longitudinal bead 22 of the sheet for slidable movement therein.

Figure 3:
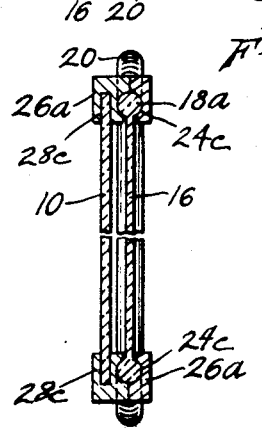
Figure 3 is a view similar to Figure 2 showing a slightly modified form of the visor.

In the modification of Figure 3, bead 22 is eliminated and the slide 26a is modified to receive the plane upper edge of sheet 10 within groove 28c; and, a modified circumferential bead 18a having a circular cross section within arcuate groove 24c. In this modification two slides 26a, one at the top and one at the bottom of the sheet, are preferably used to prevent the disk and slide from becoming detached from the sheet.

Figure 4:
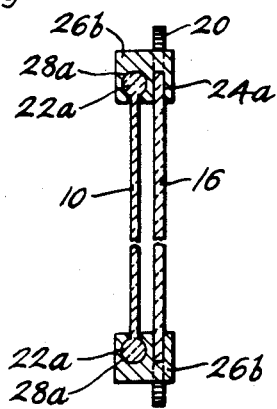
Figure 4 is a view similar to Figure 2 illustrating a further modification.

In the modification of Figure 4, the sheet 10 is provided with longitudinal beads 22a at both top and bottom. Groove 28a of the slide is adapted to receive the modified bead 22a. Also, arcuate groove 24a is modified to receive the edge of disk 16 without the circumferential bead. Two slides 26b are necessary to furnish diametrical supports for the disk.

Figure 6:
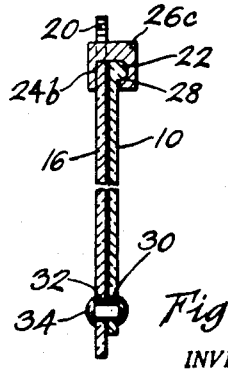

In Figures 5 and 6, sheet 10 is provided with a slot 30 parallel to longitudinal bead 22 and positioned adjacent the edge of the sheet opposite the bead. Disk 16 is provided with an arcuate slot 32 adjacent its outer edge and extending approximately 90 degrees. The circumferential bead is eliminated and the slide 26c is modified over slide 26 by changing groove 24 to receive the plane edge of the disk as shown at 24b. A fastener 34 passing through arcuate slot 32 in the disk and slot 30 of the sheet supports the disk and replaces toe slide of Figures 3 and 4 along the lower edge of the sheet.

It is to be understood that the present invention is not limited to the specific forms shown in the accompanying drawing which are merely indicative of a few of the forms it may take while still embodying all of the many novel features of the polarizing viewing visor of the present invention. It will thus be seen that the many useful objects for which the anti-glare device of the present invention have been designed have been achieved; and therefore, what is claimed is:

1. In a vehicle, polarizing viewing visor for varying the intensity of light transmitted thereby comprising: an elongate sheet of light polarizing material mounted with the plane of polarization thereof fixed relative to a viewer; a slide mounted for sliding movement along the upper edge of said sheet; a disc of polarizing material disposed in face to face relation with said sheet; said slide receiving a circumferential edge portion of the disc and guiding the same thereby for rotation with respect to the sheet to vary the amount of light transmitted through said disc and sheet, said slide being provided with a first groove receiving the upper edge of said sheet, and a second groove receiving a circumferential edge portion of and rotatably guiding said disc; one of said grooves being of generally circular cross section and an edge of one at least of said sheet and disc received in the same being provided with a bead adapted to mate with the generally circular portion of said one groove.

2. In a vehicle, a polarizing viewing visor for varying the intensity of light transmitted thereby comprising: an elongate sheet of light polarizing material mounted with the plane of polarization thereof fixed relative to a viewer; a slide mounted for sliding movement along the upper edge of said sheet; a disc of polarizing material disposed in face to face relation with said sheet; and slide receiving a circumferential edge portion of the disc and guiding the same thereby for rotation with respect to the sheet to vary the amount of light transmitted through said disc and sheet, and a second slide being slidably mounted along the lower edge of said sheet; each slide being provided with a pair of grooves at least one of which is of generally circular cross section receiving respective upper and lower edge portions of the sheet and diametrically opposed circumferential edge portions of said disc; and an edge of one at least of said sheet and said disc being provided with a bead adapted to mate with the generally circular portion of said one groove.

3. In a vehicle, a polarizing viewing visor for varying the intensity of light transmitted thereby comprising: an elongate sheet of light polarizing material mounted with the plane of polarization thereof fixed relative to a viewer; a slide mounted for sliding movement along the upper edge of said sheet; a disc of polarizing material disposed in face to face relation with said sheet; said slide receiving a circumferential edge portion of the disc and guiding the same thereby for rotation with respect to the sheet to vary the amount of light transmitted through said disc and sheet, the lower margin of said sheet being provided with an elongate slot and said disc being provided with an arcuate slot; and a double headed pin projecting through said slots to cooperate therewith and provide for the support of said disc by said slots and for guiding the same for longitudinal and rotational movement with respect to said sheet.

References Cited in the file of this patent

UNITED STATES PATENTS

| | | |
|---|---|---|
| 2,005,426 | Land | June 18, 1935 |
| 2,423,322 | Hurley | July 1, 1947 |
| 2,526,889 | McComb | Oct. 24, 1950 |